Patented May 3, 1927.

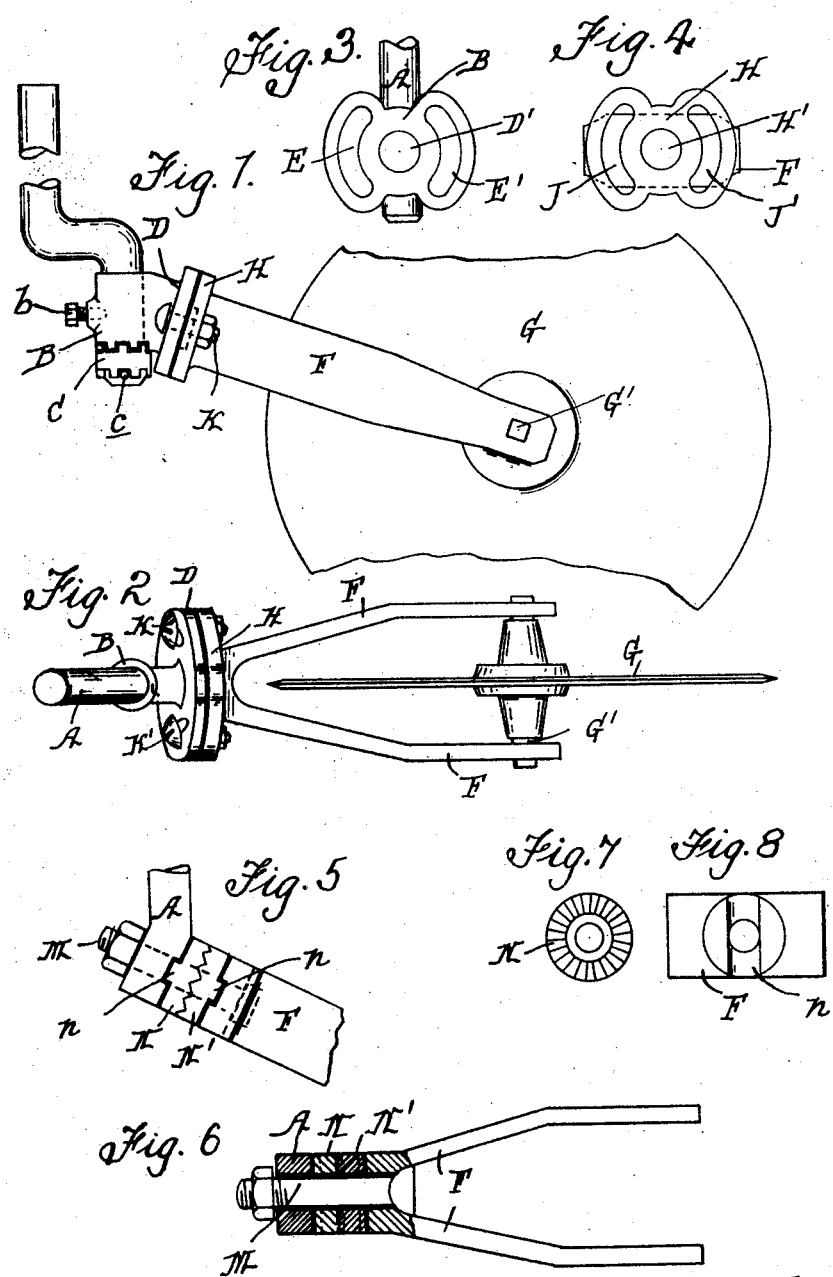

1,627,277

UNITED STATES PATENT OFFICE.

ANDREW CRAIG, OF MOTUTAPU ISLAND, NEW ZEALAND.

PLOW COLTER.

Application filed December 29, 1922, Serial No. 609,741, and in New Zealand October 7, 1922.

This invention relates to the mounting of the ordinary type of disc colter in plows, and it has been devised with the object of providing means whereby the angle of the colter both with regard to the vertical and horizontal lines of the plow, may be altered at will, in order to obtain various effects in the turning of the furrow.

The invention consists in the combination, with a colter carrying shank or stalk, of a fork attached thereto and in which the colter is journalled, such stalk and fork being so attached to one another and to the plow frame that the colter may be set at any angle to the draught line of the plow and also at any angle between perpendicular and horizontal to the surface of the ground being treated.

These results are obtained by arranging the shank or stalk to swivel in the plow frame, or alternatively by providing such shank or stalk with a sleeve bearing to turn thereon; and by connecting the colter bearing fork to such shank or stalk, or to the said bearing, by such means that it may be turned around on an axis in the plane of its length and secured at any point within the limits of the movement thus provided for.

The accompanying drawings illustrate the means for carrying out the invention, in two alternative ways. In such drawings:—

Figure 1 is a side elevation of the colter mounting means as constructed in one way.

Figure 2 is a plan thereof.

Figure 3 is a face view of the stalk member of the joint by means of which the fork is attached to the stalk.

Figure 4 is a face view of the inner end of the fork.

Figure 5 is a side elevation of the alternative means for carrying out the invention.

Figure 6 is a sectional plan thereof taken along the axial line of the fork.

Figure 7 is a face view of a locking washer used in these means.

Figure 8 is an inner end elevation of the fork.

Referring to Figures 1 to 4;—In this case the stalk A is made as a fixture to the plow frame and upon its lower end has the sleeve B fitted so that it may rotate. This sleeve is designed to be securely locked at any one of a number of points in its rotation by means of the set screw $b$ and also by means of a bearing washer C on the lower end of the stalk, the upper surface of which is formed with teeth that engage between teeth correspondingly formed on the lower end of the sleeve. The washer is also formed with teeth on its bottom face, and a cotter pin $c$ passes through the shank and also between such lower teeth. When therefore the sleeve is designed to be fixed at any particular point, the set screw $b$ is loosened, the cotter pin $c$ withdrawn and the washer dropped clear, and the sleeve then turned to the required position and locked by replacing the washer and cotter pin and by tightening the set screw.

The said sleeve is formed on one side with a bearing plate D that is made to incline downwards and inwards towards its bottom end and is formed with a central boss D' projecting from its face and with two slots E and E' disposed on respectively opposite sides of the central boss and extending in lines concentric with such boss.

F is the fork, in between the members of which the colter disc G is disposed and journalled in any of the well known ways upon a spindle G' fixed to extend transversely between the fork members. In this invention the end or stem of the fork is formed or provided with a disc bearing plate H of corresponding shape and size to the bearing plate D and made on its outer face with a recess H' into which the boss D' of such bearing face fits neatly. This recess is disposed with its centre in a line with the axial line of the fork F and the colter bearing so that the fork may turn on the axis thus formed by the boss and thereby rotate on its axial line to cause the colter to assume varying angles with the ground level. The plate H is also formed with the slots J and J' on respectively opposite sides of its centre and extending concentrically therewith. These slots are so arranged that they coincide with the respective slots E and E' of the bearing plate D.

Bolts K and K' are used for fastening the fork end firmly against the bearing plate D, such bolts being passed through the coincident slots E and J and E' and J'. These, when screwed up, will hold the fork firmly in position to extend rigidly from the bearing sleeve B in the condition to hold the colter in working position. When the bolt nuts are loosened, the fork may be turned around its axial line and secured again in any desired position to adjust the vertical cutting angle of the colter.

The ability to swing the bearing sleeve B around the stalk A in the horizontal plane will allow for the fore and aft angle of the fork being adjusted with regard to the plow frame and thus also provide for the adjustment of the colter's horizontal cutting angle.

In the construction shown in Figures 5 to 8, the same results are obtainable; but in this case the stalk A is itself swivelled to rotate about its axis in the plow frame in a manner already well known, to provide for the fore and aft adjustment of the fork. To obtain the vertical adjustment of the colter's angle, the fork F is in this case attached to the lower end of the stalk by means of a bolt M that is passed through from the forward end of the fork and through the stalk in a line axially with the axial line of the fork. The lower end of the stalk is given a bend so that the fork extends with the downward inclination necessary for the drag on the colter. Interposed, however, between the stalk face and the end of the fork are two washers N and N' which are respectively locked to such stalk face and the fork by keys $n$, and the engaging surfaces of both of which are made with radial interlocking teeth, as shown in Figure 7, so that when the bolt M is screwed up these two washers are locked together, and being respectively locked with the stalk and fork, a rigid fastening of the fork to the stalk is obtained. By loosening the bolt M to a sufficient extent to allow the teeth of the washers N and N' to free one another, the fork may be turned around on the bolt as a pivot, until the colter assumes the angle to the vertical that is desired and it may then be locked in such position by screwing up the bolt again.

I claim:—

1. A colter securing means, comprising a stalk adapted to be secured in vertical position to a plow frame; a sleeve rotatably adjustable on the lower portion of the stalk and formed with a toothed lower edge; a fastening ring detachably secured to said stalk immediately below the sleeve and formed with a toothed upper edge to adjustably interlock with the teeth on said sleeve so as to hold the latter in adjusted position; a member for clamping the sleeve directly to the stalk; a downwardly and inwardly inclined bearing plate rigidly connected to said sleeve and formed with a central projection, and with a pair of arcuate slots at opposite sides of and concentric with such projection; a colter fork provided with a bearing plate which is disposed flat against the first plate and which is formed with a central recess wherein the projection on that plate is journalled, and with a pair of arcuate slots at opposite sides of and concentric with such recess and adapted to register with the first slots to enable a rotary adjustment of the fork about its axis with relation to the said first plate and the sleeve and stalk; and fasteners passing through the pairs of registering slots to retain the fork in adjusted position.

2. A colter securing means, according to claim 1, in which the fastening ring has its lower edge, as well as its upper, toothed; and in which a removable colter pin is passed through the stalk end and engaged with the lower teeth on the ring to lock the latter to the stalk.

In testimony whereof I affix my signature.

ANDREW CRAIG.